(12) United States Patent
Chen et al.

(10) Patent No.: US 8,457,775 B2
(45) Date of Patent: Jun. 4, 2013

(54) METHOD FOR DEFINING A UNIFORM INJECTION MOLDING INTERFACE AND AN INJECTION MOLDING SYSTEM USING THE SAME

(75) Inventors: Mi-Chien Chen, Taipei Hsien (TW); Hsien-Cheng Kuo, Taipei Hsien (TW); Wei Zeng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 847 days.

(21) Appl. No.: 12/561,446

(22) Filed: Sep. 17, 2009

(65) Prior Publication Data
US 2010/0332018 A1    Dec. 30, 2010

(30) Foreign Application Priority Data

Jun. 29, 2009    (CN) .............................. 2009 1 030809

(51) Int. Cl.
| | |
|---|---|
| G06F 3/048 | (2006.01) |
| G06F 12/00 | (2006.01) |
| G06F 13/00 | (2006.01) |
| G06F 12/14 | (2006.01) |
| B29C 45/00 | (2006.01) |
| B29C 45/04 | (2006.01) |
| B29C 45/46 | (2006.01) |

(52) U.S. Cl.
CPC ............... *B29C 45/045* (2013.01); *B29C 45/46* (2013.01); *G06F 3/048* (2013.01)
USPC ........... 700/201; 700/200; 700/202; 700/203; 700/204; 700/205; 715/771; 726/17; 425/145

(58) Field of Classification Search
USPC ...... 700/200, 201, 202–205; 715/771; 726/17
See application file for complete search history.

(56) References Cited

U.S. PATENT DOCUMENTS

| | | | | | |
|---|---|---|---|---|---|
| 4,847,023 | A | * | 7/1989 | Neko | 700/200 |
| 4,931,246 | A | * | 6/1990 | Kudert et al. | 425/133.1 |
| 4,934,915 | A | * | 6/1990 | Kudert et al. | 425/132 |
| 5,052,909 | A | * | 10/1991 | Hertzer et al. | 425/150 |
| 5,316,707 | A | * | 5/1994 | Stanciu et al. | 700/200 |
| 5,325,287 | A | * | 6/1994 | Spahr et al. | 700/200 |
| 5,461,570 | A | * | 10/1995 | Wang et al. | 700/110 |

(Continued)

OTHER PUBLICATIONS

Eurotherm Limited, "Eurotherm® Flexible Solutions, Eycon™ Series, Visual Supervisors", 2008, Part No. HA029401, Issue 4, Retrieved from the Internet at www.eurotherm.com/eycon on Jun. 21, 2012.*

(Continued)

*Primary Examiner* — Mohammad Ali
*Assistant Examiner* — Kelvin Booker
(74) *Attorney, Agent, or Firm* — Altis Law Group, Inc.

(57) ABSTRACT

A method for defining a uniform injection molding interface includes selecting at least one common control parameter from multiple injection molding machines, setting at least one standardization page, establishing a uniform injection molding interface by configuring the at least one common control parameter into the at least one standardization page, storing the data related to the uniform injection molding interface into a storage unit, and connecting the uniform injection molding interface to the control device via an input control device to enable the control device to control the multiple injection molding machines in response to the control parameters set via the uniform injection molding interface.

18 Claims, 6 Drawing Sheets

U.S. PATENT DOCUMENTS

| | | | | |
|---|---|---|---|---|
| 5,696,686 | A * | 12/1997 | Sanka et al. | 700/110 |
| 6,289,259 | B1 * | 9/2001 | Choi et al. | 700/200 |
| 6,464,909 | B1 * | 10/2002 | Kazmer et al. | 264/40.1 |
| 6,514,440 | B1 * | 2/2003 | Kazmer et al. | 264/39 |
| 6,522,939 | B1 * | 2/2003 | Strauch et al. | 700/116 |
| 6,589,039 | B1 * | 7/2003 | Doughty et al. | 425/145 |
| 6,632,079 | B1 * | 10/2003 | Kazmer et al. | 425/145 |
| 6,713,002 | B2 * | 3/2004 | Kazmer et al. | 425/146 |
| 6,767,486 | B2 * | 7/2004 | Doughty et al. | 425/572 |
| 6,769,896 | B2 * | 8/2004 | Kazmer et al. | 425/145 |
| 6,824,379 | B2 * | 11/2004 | Doyle et al. | 425/564 |
| 6,868,305 | B2 * | 3/2005 | Choi et al. | 700/200 |
| 6,931,300 | B2 * | 8/2005 | Yamazaki et al. | 700/200 |
| 7,029,268 | B2 * | 4/2006 | Doyle et al. | 425/562 |
| 7,234,929 | B2 * | 6/2007 | Vasapoli et al. | 425/145 |
| 7,270,537 | B2 * | 9/2007 | Doyle et al. | 425/562 |
| 7,419,625 | B2 * | 9/2008 | Vasapoli et al. | 425/145 |
| 7,569,169 | B2 * | 8/2009 | Vasapoli et al. | 425/145 |
| 7,597,828 | B2 * | 10/2009 | Doyle et al. | 425/145 |
| 7,676,279 | B2 * | 3/2010 | Hood et al. | 700/17 |
| 7,680,550 | B2 * | 3/2010 | Weatherhead et al. | 700/27 |
| 7,684,877 | B2 * | 3/2010 | Weatherhead et al. | 700/21 |
| 7,725,200 | B2 * | 5/2010 | Reed et al. | 700/30 |
| 7,901,601 | B2 * | 3/2011 | Vasapoli et al. | 425/564 |
| 8,016,581 | B2 * | 9/2011 | Vasapoli et al. | 425/145 |
| 2002/0013642 | A1 * | 1/2002 | Choi et al. | 700/200 |
| 2003/0012845 | A1 * | 1/2003 | Doyle et al. | 425/562 |
| 2003/0155672 | A1 * | 8/2003 | Kazmer et al. | 264/40.1 |
| 2003/0180409 | A1 * | 9/2003 | Kazmer et al. | 425/145 |
| 2003/0198702 | A1 * | 10/2003 | Kazmer et al. | 425/135 |
| 2003/0203064 | A1 * | 10/2003 | Doughty et al. | 425/145 |
| 2004/0047935 | A1 * | 3/2004 | Moss et al. | 700/200 |
| 2004/0047942 | A1 * | 3/2004 | Vasapoli et al. | 700/200 |
| 2004/0088066 | A1 * | 5/2004 | Yamazaki et al. | 700/95 |
| 2006/0127527 | A1 * | 6/2006 | Doyle et al. | 425/570 |
| 2006/0282186 | A1 * | 12/2006 | Hansen et al. | 700/197 |
| 2007/0026426 | A1 * | 2/2007 | Fuernkranz et al. | 435/6 |
| 2007/0106420 | A1 * | 5/2007 | Wyrwoll | 700/200 |
| 2007/0224303 | A1 * | 9/2007 | Vasapoli et al. | 425/146 |
| 2007/0273060 | A1 * | 11/2007 | Doyle et al. | 700/200 |
| 2008/0097624 | A1 * | 4/2008 | Weatherhead et al. | 700/9 |
| 2008/0097626 | A1 * | 4/2008 | Reed et al. | 700/30 |
| 2008/0097629 | A1 * | 4/2008 | Weatherhead et al. | 700/67 |
| 2008/0189636 | A1 * | 8/2008 | Hood et al. | 715/771 |
| 2008/0315445 | A1 * | 12/2008 | Vasapoli et al. | 264/40.5 |
| 2009/0028986 | A1 * | 1/2009 | Vasapoli et al. | 425/563 |
| 2009/0061034 | A1 * | 3/2009 | Vasapoli et al. | 425/145 |
| 2009/0164039 | A1 * | 6/2009 | Jung et al. | 700/117 |
| 2009/0171476 | A1 * | 7/2009 | Aloni | 700/7 |
| 2009/0292389 | A1 * | 11/2009 | Jung et al. | 700/117 |
| 2010/0082814 | A1 * | 4/2010 | Plache et al. | 709/226 |
| 2011/0004946 | A1 * | 1/2011 | Lee et al. | 709/206 |
| 2011/0160895 | A1 * | 6/2011 | Chen et al. | 700/200 |
| 2011/0178619 | A1 * | 7/2011 | Jung et al. | 700/95 |

OTHER PUBLICATIONS

Eurotherm Limited, "Eurotherm® DCS System, EurothermSuite™ Visualisation", 2009, Part No. HA030268, Issue 1, Retrieved from the Internet at www.eurotherm.com on Jun. 21, 2012.*

Husky Injection Molding Systems, "User Guide, Altanium Matrix", Oct. 2009, Version 2.0, Retrieved from the Internet at www.Husky.com on Jun. 21, 2012.*

Siemens AG, "Operator Manual: Injection Molding Machine Control with CI-16DP and TP270/MP270/MP370", Feb. 29, 2004, Retrieved from the Internet at www.Siemens.com on Jun. 21, 2012.*

* cited by examiner

METHOD FOR DEFINING A UNIFORM INJECTION MOLDING INTERFACE AND AN INJECTION MOLDING SYSTEM USING THE SAME

BACKGROUND

1. Technical Field

The present disclosure relates to a method for defining a uniform injection molding interface and an injection molding system using the method.

2. Description of the Related Art

Injection molding is a manufacturing process for producing parts from both thermoplastic and thermosetting plastic materials, in which material is fed into a heated barrel, mixed, and injected into a mold cavity where it cools and hardens to the configuration of the mold cavity. Recently, injection molding has been widely used to manufacture various parts, from the smallest components to entire body panels of cars. Since the injection molding process is relatively complex, it is necessary to set a large number of control parameters, such as mold clamping force, injection speed, injection pressure, pressure holding temperature, and so on.

An injection machine generally provides an original interface to configure various control parameters and convey the control parameters received from input devices, such as mice, keyboards and touch panels, to a controller system positioned in the injection molding machine. The original interface is pre-defined at the factory where the injection molding machine is manufactured and configured with icons, characters, buttons, and dialog boxes therein associated with corresponding control parameters.

However, the features of the original interfaces of multiple injection molding machines are specific to the machine's manufacturer, such that familiarity with one original interface is non-transferable when operating another type of machine, which increases training costs and aggravates the burden on manpower. In addition, the original interface is generally configured with a large number of critical control parameters associated with the process, whereby operations can be severely impaired while learning the control parameters.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
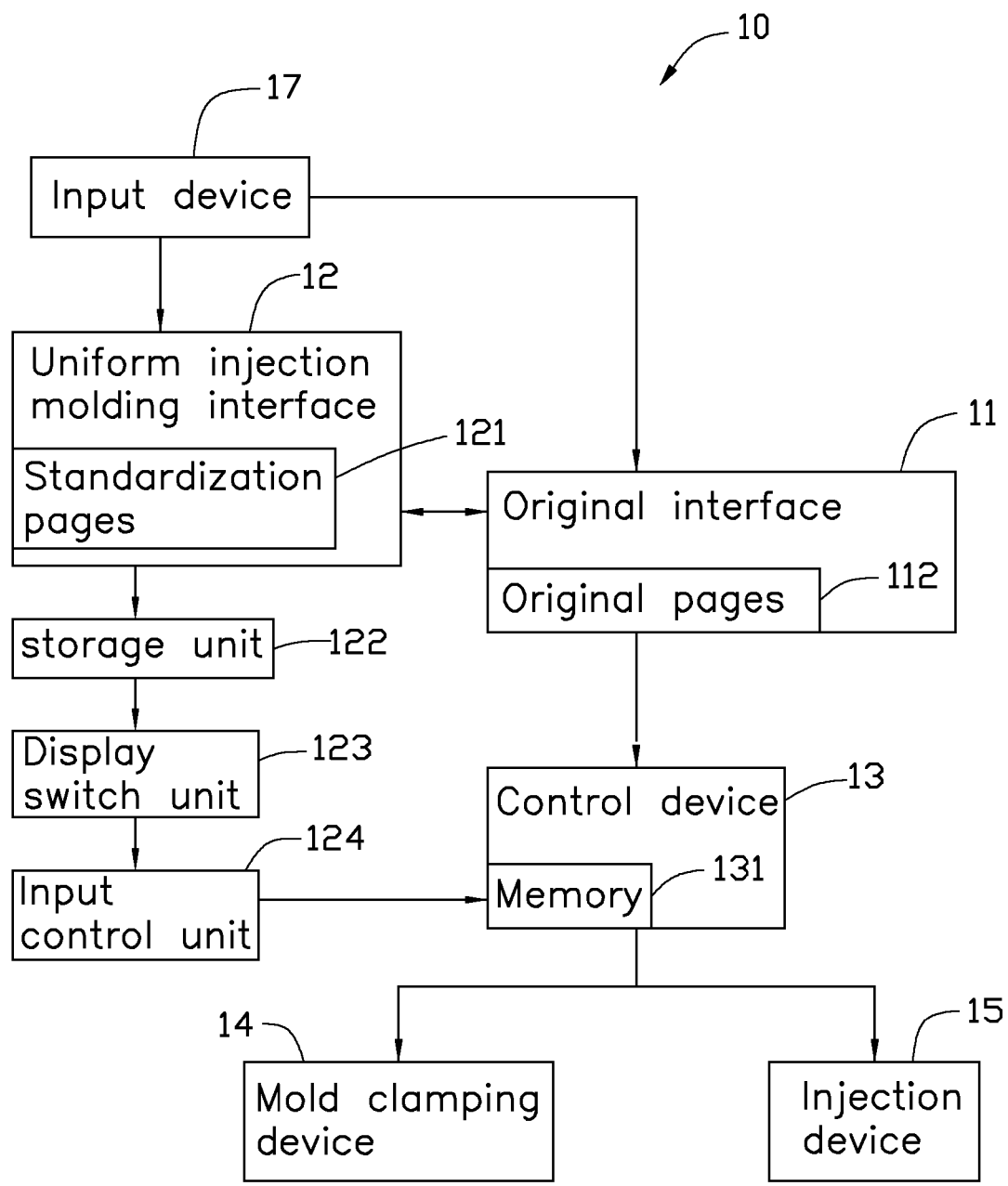
FIG. 1 is a block diagram of an embodiment of an injection molding system, utilizing a uniform injection molding interface therein.

Referring to FIGS. 1 and 2, an embodiment of an injection molding system (not shown) includes multiple injection molding machines 10. FIG. 1 shows only one injection molding machine 10. In the injection molding system, each injection molding machine 10 includes a specific original interface 11, a uniform injection molding interface 12, a control device 13, a mold clamping device 14, an injection device 15, an input device 17, and a display device (not shown). Both the original interface 11 and the uniform injection molding interface 12 are displayed on the display device, and configured to receive input from the input device 17 and convert the input into control signals for the control device 13. The control device 13 directs the mold clamping device 14 and the injection device 15 to move in response to the control signals. The control device 13 has a memory 131 therein to store the data related to the original interface 11. The input device 17 may be a mouse, a keyboard or a touch panel.

The original interface 11 is associated with the control device 13, and includes a plurality of original pages 112 with control parameters therein. The original pages 112 are each configured with icons, characters, buttons, and dialog boxes corresponding to the control parameters. The original interface 11 is pre-defined in the factory where the injection molding machine 10 is manufactured and configured with a large number of control parameters, such as mold clamping force, injection speed, injection pressure, and pressure holding temperature. Operators can initialize the control parameters and configure the injection molding machine 10 via the original interface 11.

The uniform injection molding interface 12 is provided with a plurality of standardization pages 121. Each of the standardization pages 121 can be configured with control parameters selected from the common control parameters of the original interfaces 11 of multiple injection molding machines 10, such as mold heating temperature, barrel heating temperature, and mold clamping force.

The injection molding machine 10 further includes a storage unit 122 storing the data related to the standardization pages 121; a display switch unit 123 for controlling the display of the standardization pages 121; and an input control unit 124 for receiving the input from the input device 17 and conveying the input to the original interface 11 and the control device 13. That is, as the control parameters in the uniform injection molding interface 12 are changed, the control parameters in the original interface 11 are updated accordingly.

Generally, the injection molding machines 10 supplied by different manufacturers are distinguished by the icons, characters, buttons, dialog boxes, and their arrangements, but may have common control parameters, for example, mold heating temperature, barrel heating temperature, and mold clamping force, mold clamping speed, and pressure holding time. The uniform injection molding interface 12 provides a uniform platform (not shown) associated with multiple injection molding machines 10 configured with some of the common control parameters. As a result, the operators mastering the operation of the uniform injection molding interface 12 can operate multiple injection molding machines 10 in the injection molding system, regardless of the original interface 11 with which the injection molding machine 10 is configured.

To facilitate the control parameters delivery between multiple injection molding machines, the uniform injection molding interface 12 utilizes a uniform measurement unit (not shown). Measurement unit conversion may thus be avoided when delivering the control parameters from one injection molding machine 10 to another.

Figure 2A:
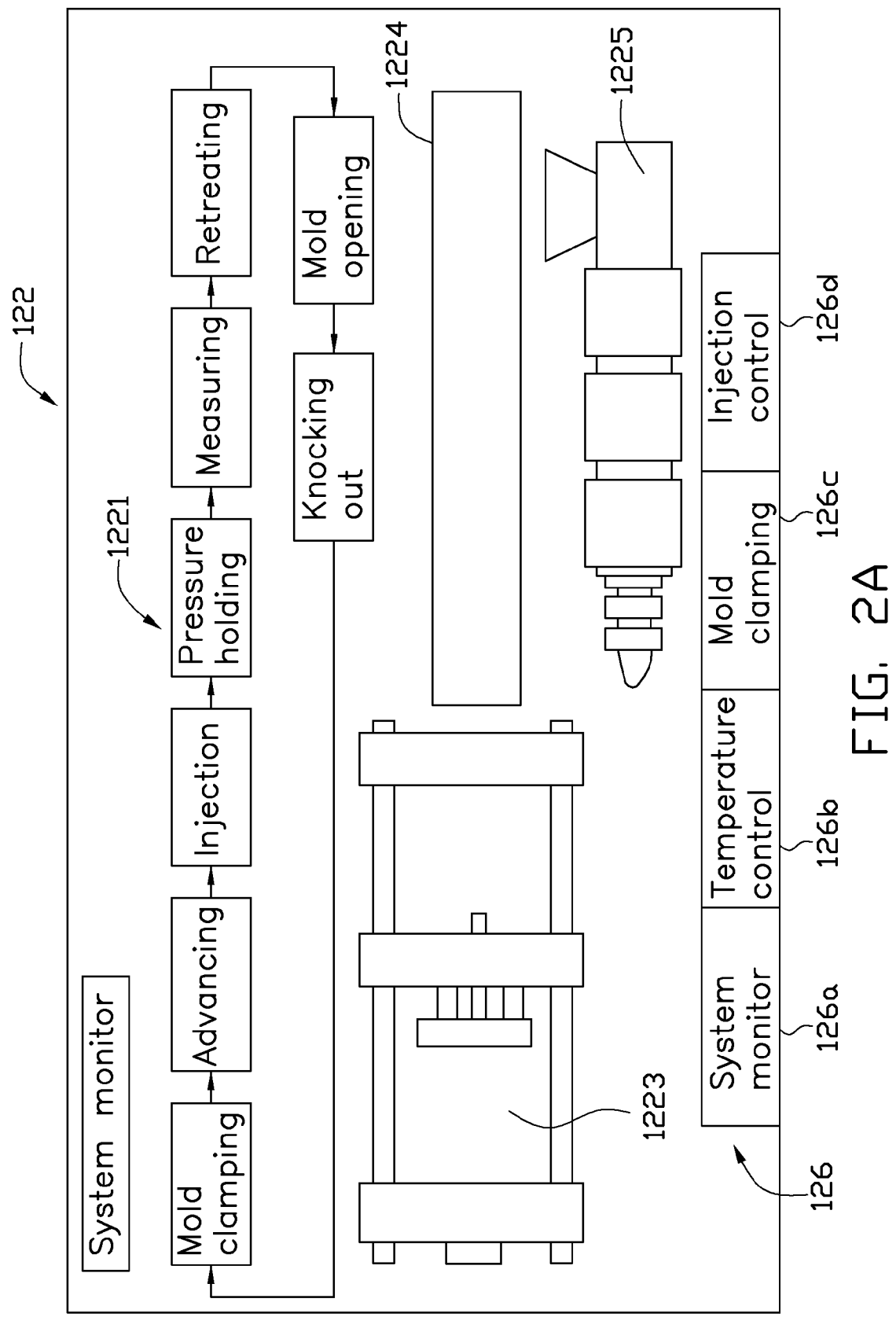
FIG. 2A is a schematic view of a system monitor page applied by the uniform injection molding interface of FIG. 1
Figure 2B:
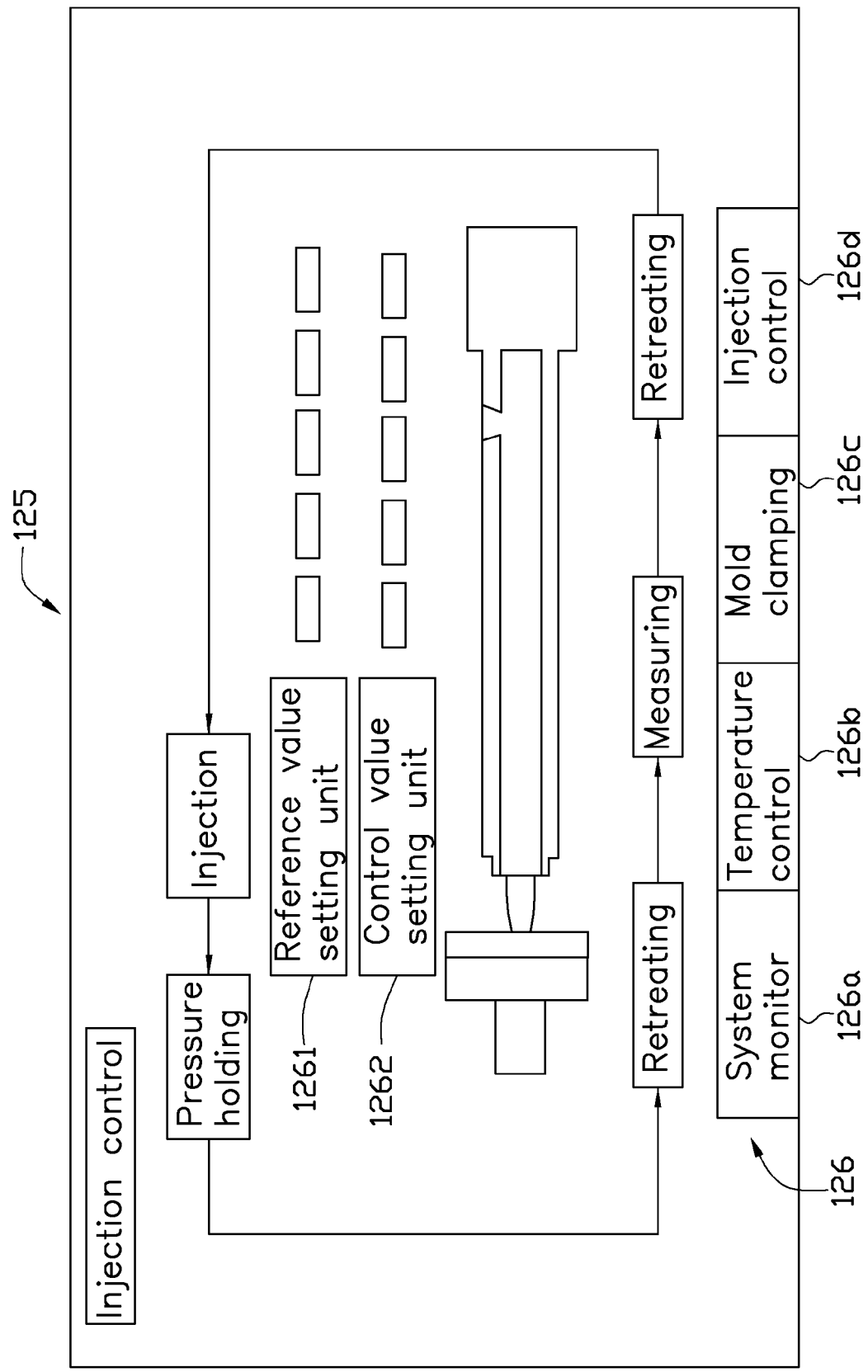
FIG. 2B is a schematic view of an injection control page applied by the uniform injection molding interface of FIG. 1

In the illustrated embodiment, the standardization pages 121 include an initial page (not shown), a system monitor page 120, a mold clamping control page (not shown), a temperature control page (not shown), and an injection control page 125. FIGS. 2A and 2B show the system monitor page 120 and injection control page 125 respectively, with other standardization pages similar to the system monitor page 120 and injection control page 125, and configured with control parameters in accord with their specific function.

The initial page is configured to display basic information of the injection mold machines 10, such as maximal mold unloading distance, maximal speed, maximal pressure, applicable materials, and some cautionary information.

The system monitor page 120 is configured with a process display area 1221, a mold state display area 1223, an injection state display area 1224, and a nozzle temperature display area 1225. The process display area 1221 is configured with characters to show which process is running, such as molding clamping, advancing, injection, pressure holding, measuring, retreating, mold opening, or knocking out. The mold state display area 1223 is configured to show the position of the stationary mold, the moveable mold and other structures. The injection state display area 1224 and the nozzle temperature display area 1225 are configured to show the actions of the reciprocating screw, the injection speed, the injection force, and the temperature distribution on the nozzle.

The temperature control page is configured to set the heating parameters of the stationary mold, the movable mold, and the barrel. The mold clamping control page is configured to set the force, speed, pressure holding time of the mold clamping process, and the position and moving speed of the stationary mold and moveable mold. The injection control page 125 is configured to show and set pressure and speed in pressure holding process and injection process.

A link button 126 is provided to enable free movement among the initial page, the system monitor page 120, the mold clamping control page, the temperature control page, and the injection control page 125. The link button 126 includes a first control portion 126a for switching to the system monitor page 120, a second control portion 126b for switching to the temperature control page, a third control portion 126c for switching to the mold clamping control page, and a fourth control portion 126d for switching to the injection control page 125.

The uniform injection molding interface 12 may be further configured with a button (not shown) to link to the original interface 11. When the button is triggered, the display switch unit 123 switches to the original interface 11 providing setting or checking of original control parameters.

Figure 3:
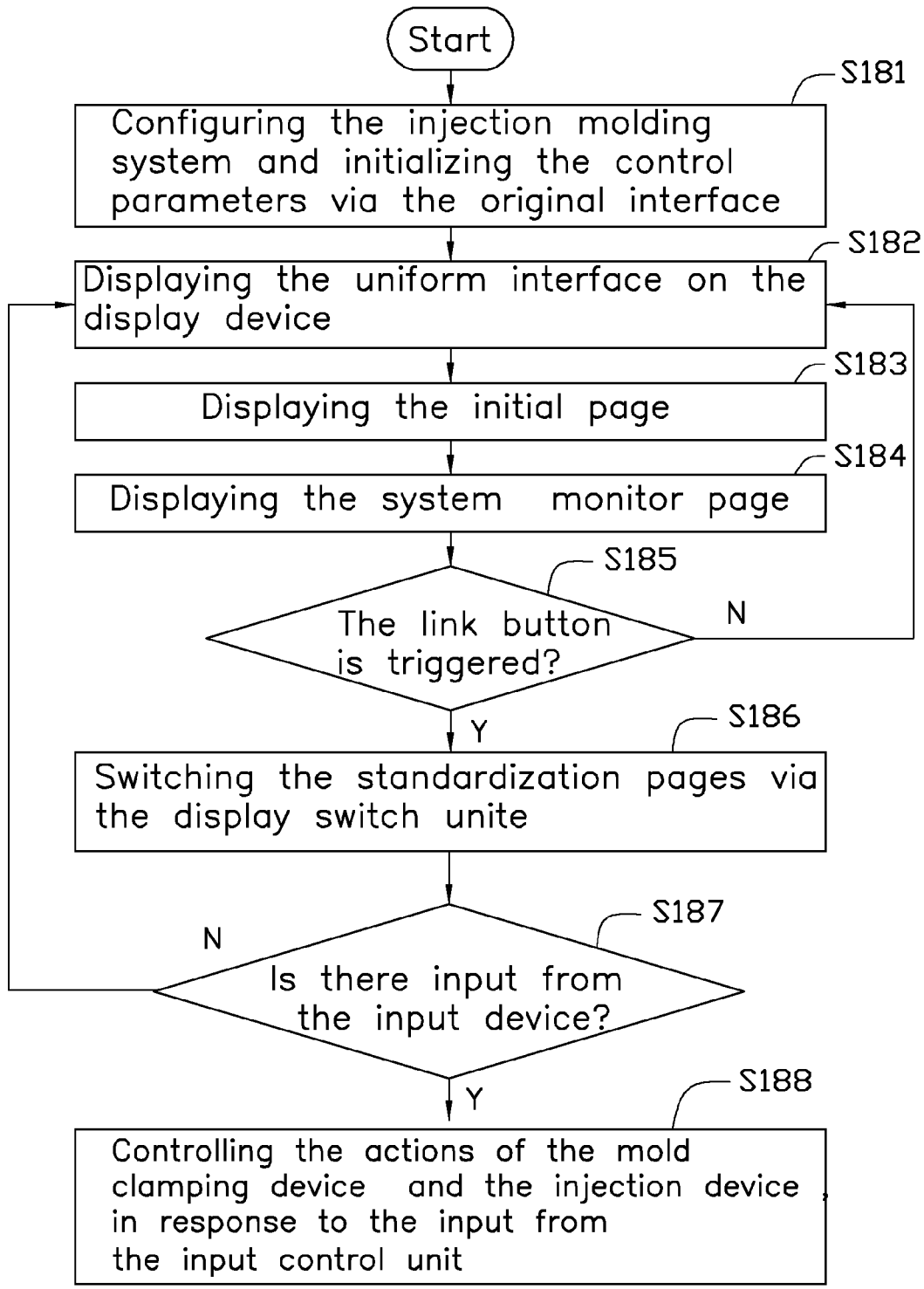
FIG. 3 is a flowchart for operating the injection molding system of FIG. 1.

Referring also to FIG. 3, operation of the injection molding system is as follows. The injection molding machine 10 is started. In block S181, the original interface 11 executes in the background to configure the injection molding system and initialize the control parameters. In block S182, the uniform injection molding interface 12 is displayed on the display device. In block S183, the initial page is displayed. In block S184, after a predetermined time, the system monitor page 120 is displayed. In block S185, in the system monitor page 120, the display switch unit 123 determines whether the link button 126 is triggered. If so, in block S186, the display switch unit 123 switches to the corresponding page. In block S187, the input control unit 124 determines whether there is input from the input device 17. In block S188, if input from the input device 17 is provided, the input control unit 124 responds and conveys the input to the original interface 11 and control device 13, and the control parameters are stored in the memory 131. The control device 13 directs operation of the mold clamping device 14 and injection device 15 in response to the input.

The uniform injection molding interface 12 is further configured with multiple permission hierarchies, at least one of which permits setting the limitation of authority. The permission hierarchies are authorized to control individual corresponding standardization pages 121. Access to the standardization pages 121 corresponds to permission hierarchies established, allowing configuration of setting parameters therein.

In the illustrated embodiment, the permission hierarchies include operating and management permission. The management permission may allow control of a specific function page for setting control parameters for a loosening core process, a knocking out process, and so on.

Again referring to FIG. 2B, a reference value setting unit 1261 for setting a reference value configured in the standardization pages 121 is controlled by management permission. The reference value is stored in the storage unit 122 and displayed in the pages controlled by the operation permission. When setting the control parameters in the standardization pages controlled by the operation permission, the setting value set by a control value setting unit 1262 is limited to a predetermined range based on the reference value, which, at this time, cannot be changed by the operator with the operation permission. For example, those with management permission can set a percentage to limit the adjustable range within the value by multiplying the percentage by the reference value. As a result, errors based on inexperience are avoided.

Figure 4:
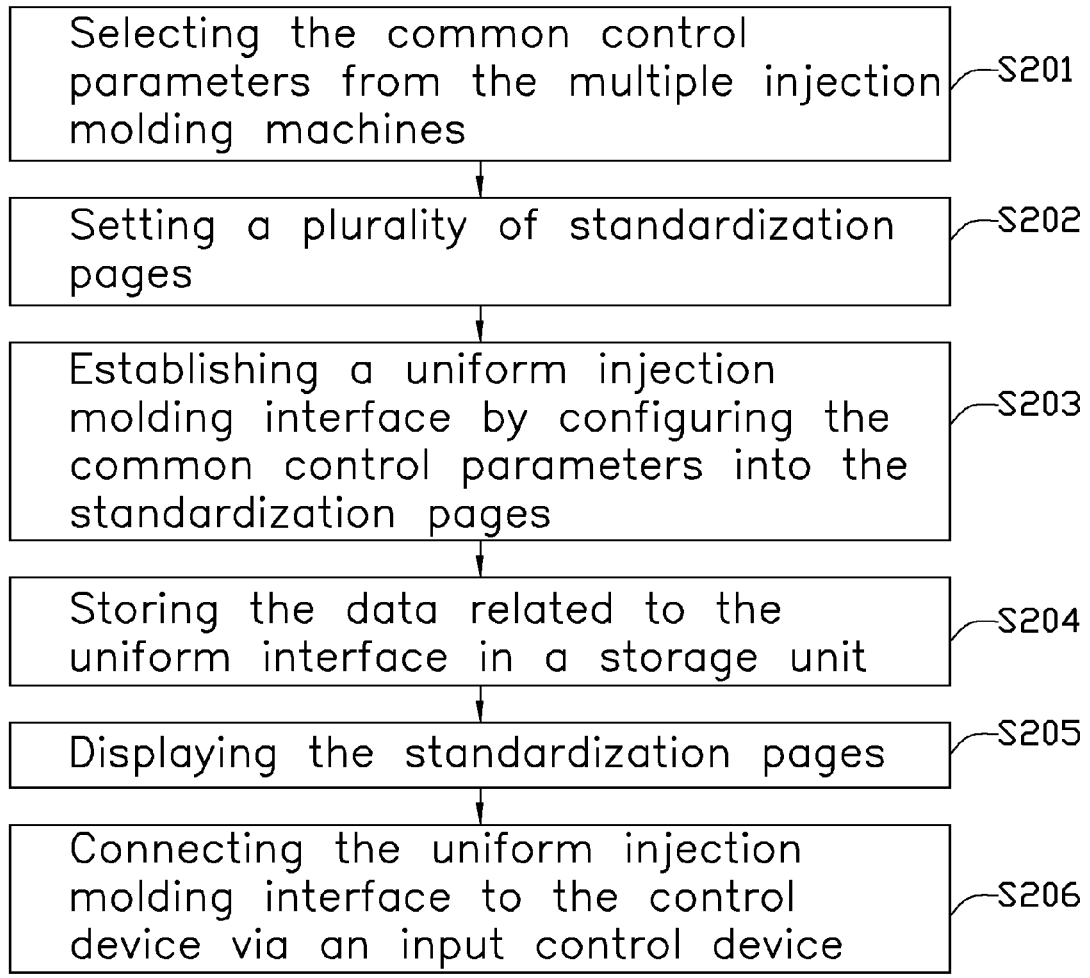
FIG. 4 is a flowchart of an embodiment of a method for defining a uniform injection molding interface for injection molding as disclosed, applicable in a system such as, for example, that of FIG. 1.

FIG. 4 is a flowchart illustrating an embodiment of a method for defining a uniform injection molding interface 12 for multiple injection molding machines. Depending on the embodiment, certain of the steps described below may be removed, others may be added.

In step S201, some common control parameters configured in multiple original interfaces 11 are selected. In step 202, a plurality of standardization pages 121 configured with icons, marks, and characters corresponding to the control parameters are provided. The standardization pages 121 may include an initial page, a system monitor page, a mold clamping control page, a temperature control page, an injection control page, and a specific function page. In step 203, the selected common control parameters are configured in the standardization pages 121, and the uniform injection molding interface 12 is established and ready for display on the display device. In step 204, the data related to the uniform injection molding interface 12 is stored in the storage unit 122. In step 205, the display switch unit 123 displays standardization pages 121 selected by the link button 126. In step 206, the input control unit 124 connects the uniform injection molding interface 12 to the control device, which directs operation of the injection molding machine 10, in response to the control parameters set in the uniform injection molding interface 12.

Figure 5:
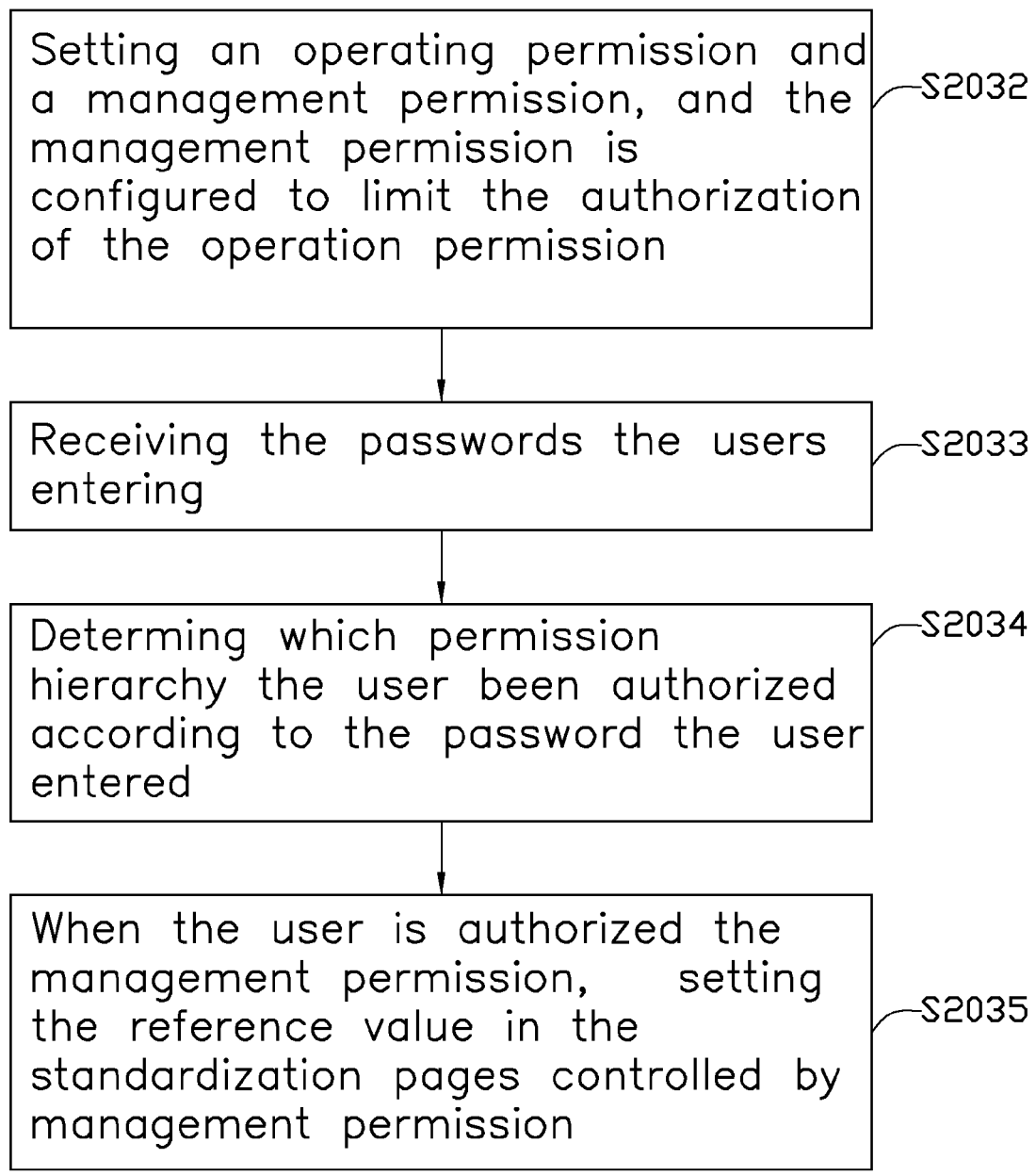
FIG. 5 is a flowchart for setting different permission hierarchies controlling the uniform injection molding interface of FIG. 4.

Referring also to FIG. 5, the method for defining a uniform injection molding interface 12 may further include setting different permission hierarchies. In step S2032, operating and management permissions are provided. Both the operation permission and the management permission control the standardization pages 121, and the management permission is configured to set the limitation of authority of the operating permission. In steps S2033 and S2034, a determination unit determines which permission hierarchy has been authorized according to the password entered. Access to the standardization pages 121 corresponds to permission hierarchies authorized and allows configuration of control parameters in the uniform injection molding interfaces 121. In step S2035, when management permission is authorized in the standardization pages controlled by management permission, the reference value can be set via the reference value setting unit 1261. The reference value is stored in the storage unit 122 and displayed in the standardization pages controlled by the operation permission, including limits set thereby.

Depending on the embodiment, certain of the blocks described may be removed, others may be added, and the sequence of blocks may be altered. It is also to be understood that the description and the claims drawn to a method may include some indication in reference to certain blocks. However, the indication used is only to be viewed for identification purposes and not as a suggestion as to an order for the blocks.

It is believed that the present embodiments and their advantages will be understood from the foregoing description, and it will be apparent that various changes may be made thereto without departing from the spirit and scope of the embodiments or sacrificing all of its material advantages, the examples hereinbefore described merely being preferred or exemplary embodiments.

What is claimed is:

1. A method for defining a uniform injection molding interface for use with a plurality of injection molding machines supplied by different manufacturers, the injection molding machines being configured with a plurality of common control parameters, and each comprising an original interface to set control parameters from which the common control parameters are selected and a control device to control the injection molding machine in response to the control parameters, the method comprising:
    selecting at least one of the common control parameters from the injection molding machines supplied by different manufacturers;
    setting at least one standardization page;
    establishing a uniform injection molding interface via configuring the at least one of the common control parameters into the at least one standardization page, wherein the uniform injection molding interface provides a uniform platform associated with each of the injection molding machines, the uniform platform configured with the at least one of the common control parameters;
    storing the data related to the uniform injection molding interface into a storage unit of each of the injection molding machines; and
    connecting the uniform injection molding interface to the control device via an input control device of each of the injection molding machines to enable the control device to control the injection molding machines in response to the control parameters set via the uniform injection molding interface.

2. The method for defining a uniform injection molding interface of claim 1, wherein the at least one standardization page is a plurality of standardization pages, the method further comprising:
    setting a plurality of permission hierarchies to control the standardization pages;
    determining to which permission hierarchy a user is authorized; and
    authorizing user access to the standardization pages corresponding to the determined permission.

3. The method for defining a uniform injection molding interface of claim 2, wherein the permission hierarchies comprise operating and management permissions, and the management permission is configured to limit the authorization of the operation permission.

4. The method for defining a uniform injection molding interface of claim 3, further comprising setting a reference value of a common control parameter via a reference value setting unit in the standardization pages controlled by the management permission, wherein when a setting value corresponding to the reference value is set by an operation permission holder, the setting value is limited to a predetermined range.

5. The method for defining a uniform injection molding interface of claim 2, wherein the determination of the permission hierarchy comprises matching input authentication data with predetermined data stored in the storage unit of each of the injection molding machines.

6. The method for defining a uniform injection molding interface of claim 1, wherein the common control parameters comprise mold heating temperature, barrel heating temperature, mold clamping force, mold clamping speed, and pressure holding time.

7. The method for defining a uniform injection molding interface of claim 1, wherein the at least one standardization page is a plurality of standardization pages, which comprise an initial page, a system monitor page, a mold clamping control page, a temperature control page, and an injection control page.

8. The method for defining a uniform injection molding interface of claim 7, wherein the system monitor page is configured with a process display area to show current running process, a mold state display area to show positions of a stationary mold, a moveable mold and other structures of each of the injection molding machines, an injection state display area and a nozzle temperature display area to show actions of a reciprocating screw, an injection speed, an injection force, and a temperature distribution on a nozzle of each of the injection molding machines.

9. The method for defining a uniform injection molding interface of claim 1, wherein the at least one standardization page is a plurality of standardization pages, the method further comprising switching a current displayed standardization page to another displayed standardization page via a display switch unit of each of the injection molding machines.

10. The method for defining a uniform injection molding interface of claim 1, further comprising switching between the uniform injection molding interface and the original interface via a button set in the at least one standardization page.

11. An injection molding system comprising:
    a plurality of injection molding machines supplied by different manufacturers and configured with a plurality of common control parameters, each injection molding machine comprising:
    an original interface configured for setting control parameters of the injection molding machine, wherein the common control parameters are selected from the control parameters of the injection molding machine;
    a control device configured for controlling the injection molding machine in response to the control parameters;
    a uniform injection molding interface comprising at least one standardization page, and at least one of the common control parameters, the at least one of the common control parameters being configured in the at least one standardization page;
    a storage unit configured to store the data related to the uniform injection molding interface; and
    an input control device to connect the uniform injection molding interface to the control device, such that the control device is capable of controlling the injection molding machine in response to the control parameters set via the uniform injection molding interface.

12. The injection molding system of claim 11, wherein the at least one standardization page is a plurality of standardization pages, which comprise an initial page, a system monitor page, a mold clamping control page, a temperature control page, and an injection control page.

13. The injection molding system of claim 12, wherein the system monitor page is configured with a process display area to show a current running process, a mold state display area to show positions of a stationary mold, a moveable mold and other structures of the injection molding machine, an injection state display area and a nozzle temperature display area to show actions of a reciprocating screw, an injection speed, an injection force, and a temperature distribution on a nozzle of the injection molding machine.

14. The injection molding system of claim 11, wherein the at least one standardization page is a plurality of standardization pages, and each injection molding machine further comprises a display switch unit configured to switch the currently displayed standardization page to another displayed standardization page.

15. The injection molding system of claim 11, wherein the at least one standardization page is a plurality of standardization pages, and each injection molding machine further comprises:

a plurality of permission hierarchies configured to control the standardization pages; and
a determination unit to determine to which permission hierarchy a user is authorized, with access granted to the standardization pages corresponding to the determined permission.

16. The injection molding system of claim 15, wherein the permission hierarchies comprise operating and management permissions, and the management permission is configured to limit the authorization of the operation permission.

17. The injection molding system of claim 16, wherein each injection molding machine further comprises a reference value setting unit configured to set a reference value of a common control parameter in the standardization pages controlled by the management permission, and when a setting value corresponding to the reference value is set by an operation permission holder, the setting value is limited to a predetermined range.

18. The injection molding system of claim 15, wherein the determination unit determines to which permission hierarchy a user is authorized by matching input authentication data with predetermined data stored in the storage unit.

* * * * *